(12) United States Patent
Archer, Jr.

(10) Patent No.: US 7,029,534 B1
(45) Date of Patent: Apr. 18, 2006

(54) APPARATUS FOR SPREADING LIQUID LINER IN ROCKET TUBE

(75) Inventor: Harry L. Archer, Jr., Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/985,064

(22) Filed: Nov. 10, 2004

(51) Int. Cl.
*B05C 13/02* (2006.01)
*B05C 7/00* (2006.01)

(52) U.S. Cl. .................. 118/500; 118/503; 118/504; 118/505; 118/254; 269/287; 269/152

(58) Field of Classification Search .............. 118/500, 118/503, 504, 505, 215, 254, 306, 317; 269/228, 269/287, 152; 427/282, 429; 29/760, 281.1, 29/282
See application file for complete search history.

(56) References Cited

U.S. PATENT DOCUMENTS

| 4,131,051 A | 12/1978 | Schaffling | 86/1 |
|---|---|---|---|
| 4,185,557 A | 1/1980 | Gerrish, Jr. | 102/103 |
| 4,564,988 A * | 1/1986 | Norrod | 29/235 |
| 4,736,684 A | 4/1988 | Byrd et al. | |
| 4,803,019 A | 2/1989 | Graham et al. | 264/3.1 |
| 4,821,511 A | 4/1989 | Felix | 60/255 |
| 5,767,221 A | 6/1998 | Poulter et al. | 528/51 |
| 2003/0017275 A1 * | 1/2003 | Schick et al. | 427/421 |

* cited by examiner

*Primary Examiner*—Laura Edwards
(74) *Attorney, Agent, or Firm*—Fredric J. Zimmerman

(57) ABSTRACT

An apparatus for spreading liquid liner in the interior of a rocket motor tube, the rocket motor tube having masks attached at both ends of the rocket motor tube, the apparatus including a generally vertical support plate with an opening there through; a flange with a center opening attached to the support plate; a support tube inserted into the center opening of the flange; a stop disposed in the support tube, the stop abutting the support plate and engaging a mask on one end of the rocket motor tube; a retaining funnel that engages a mask on the other end of the rocket motor tube; a retaining ring that threadingly engages the retaining funnel; and at least two clamps attached to the support tube and engaging the retaining ring.

15 Claims, 7 Drawing Sheets

APPARATUS FOR SPREADING LIQUID LINER IN ROCKET TUBE

STATEMENT OF GOVERNMENT INTEREST

The invention described herein may be manufactured and used by or for the Government of the United States of America for government purposes without the payment of any royalties thereof.

BACKGROUND OF THE INVENTION

The invention relates in general to devices for spreading liquid liner on the interior of rocket tubes and in particular to a device for spreading liquid liner in a rocket tube that has deposited therein a continuous bead of liner. After the liner is spread, another apparatus, such as a spinner, further distributes the liner in the rocket tube.

Rocket motor tubes are lined with a fire retardant liner to prevent the propellant from burning through the tube wall. The rocket tubes are, for example, about three feet long and two to three inches in diameter. U.S. patent application Ser. No. 10/927,647, filed on Aug. 25, 2004, entitled "Apparatus For Applying Liquid Liner To Rocket Tube," having the same inventor as the present application, discloses an apparatus for dispensing a continuous bead of liner into a rocket motor tube. The contents of the above noted previous application are hereby expressly incorporated by reference.

After depositing the continuous bead of liner in the rocket tube, the liner must be spread around to cover the interior of the rocket tube. The present invention uses a powered brush and a rocket tube support or holder to accomplish the spreading operation. After the brushing operation, another apparatus (not part of the present invention) is used to spin the tubes to further uniformly apply the liner to the interior of the tube.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION OF THE PREFERRED EMBODIMENTS

Figure 1:
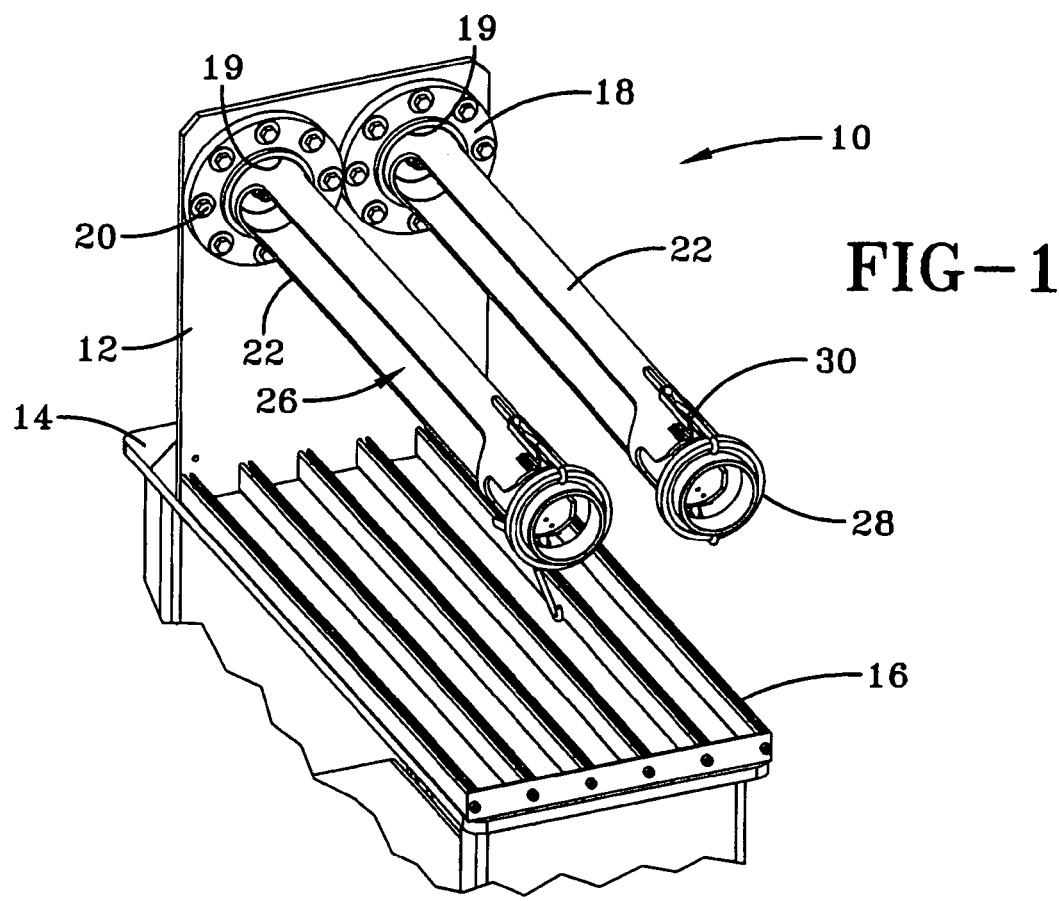
FIG. 1 is a front perspective view of an apparatus according to the invention.
Figure 2:
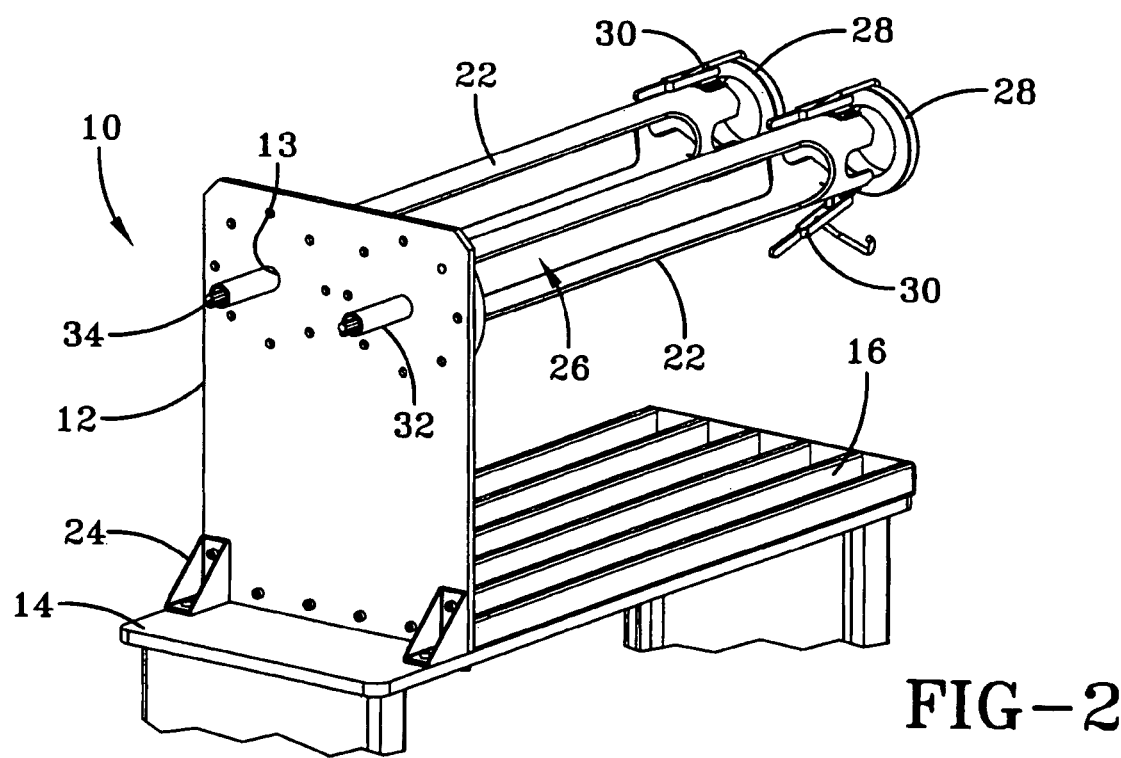
FIG. 2 is a rear perspective view of the apparatus of FIG. 1.

FIGS. 1 and 2 show an apparatus for spreading liquid liner in the interior of a rocket motor tube. The rocket motor tube (not shown in FIGS. 1 and 2) has masks attached at both ends of the rocket motor tube and a bead of liner deposited in its interior. FIG. 1 is a front perspective view of one embodiment 10 of an apparatus according to the invention. FIG. 2 is a rear perspective view of the embodiment 10 of FIG. 1. As shown in FIGS. 1 and 2, the apparatus 10 comprises a generally vertical support plate 12 with an opening 13 there through. The support plate 12 may be mounted to a table 14 (partially shown in FIGS. 1 and 2) using brackets 24. The top of table 14 may be fitted with rails 16 for temporarily storing rocket motor tubes. While FIGS. 1 and 2 show the support plate 12 attached to a table 14, the support plate 12 may be attached directly to, for example, a floor surface.

Figure 8:
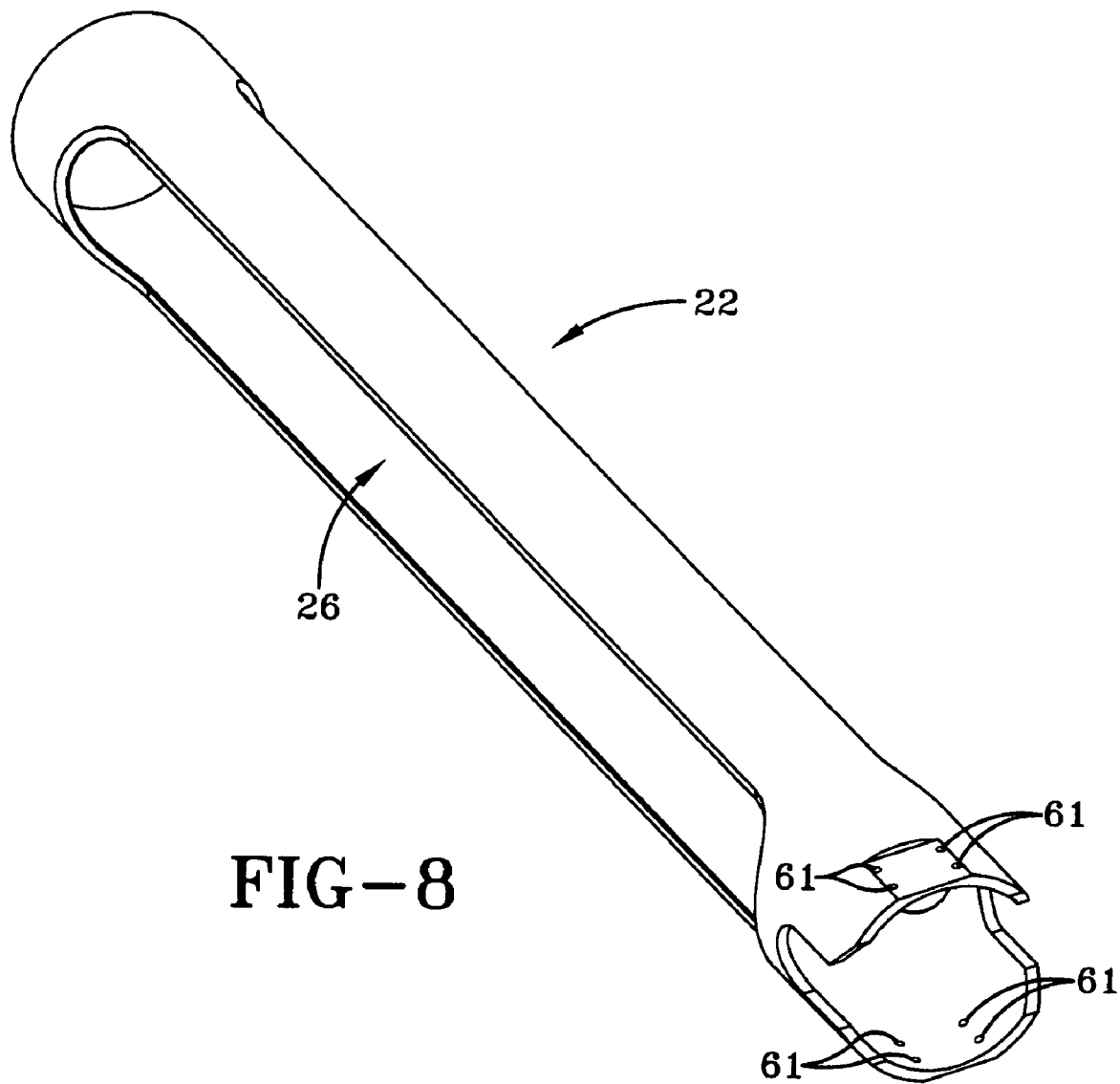
FIG. 8 is a perspective view of a support tube.

By way of example, FIGS. 1 and 2 show two support tubes 22, however, the apparatus may use a single support tube or multiple support tubes. The structure associated with each support tube is identical, therefore, only a single support tube will be described. See FIG. 8 for an enlarged view of a single support tube 22. Apparatus 10 further includes a flange 18 attached to the support plate 12 using fasteners 20. Flange 18 has a center opening 19. A support tube 22 threadingly engages the center opening 19 of the flange 18. Retaining ring 28 is disposed on support tube 22 on an end opposite flange 18. At least two clamps 30 are attached to the support tube 22 and engage the retaining ring 28. Additional clamps 30 may be used, if desired.

Figure 3:
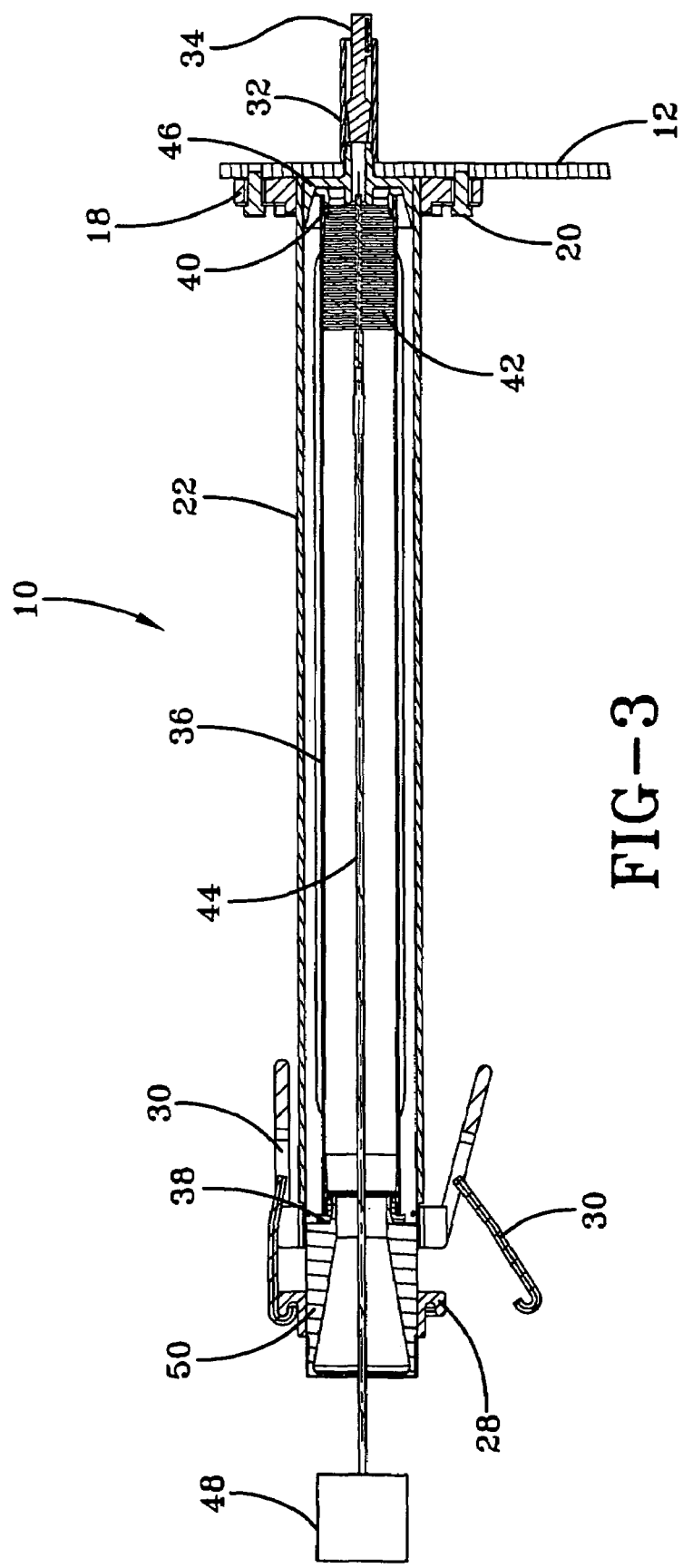
FIG. 3 is a sectional view of a rocket tube in the apparatus of FIG. 1.

FIG. 3 is a side sectional view of a rocket tube 36 mounted in the apparatus 10 of FIG. 1. Mounted in the ends of rocket tube 36 are masks 38 (left end) and 40 (right end). A stop 46 is disposed in the support tube 22. The stop 46 abuts the support plate 12 and engages the mask 40 on the right end of the rocket tube 36. A retaining funnel 50 engages the mask 38 on the left end of the rocket tube 36. For spreading the bead of liner in the rocket tube 36, a brush 42 is provided. Brush 42 is connected to rod 44, which is connected to a power tool 48. Power tool 48 may be air or electrically operated. Brush 42 is moved axially back and forth in rocket tube 36 to spread the liquid liner therein.

Figure 4:
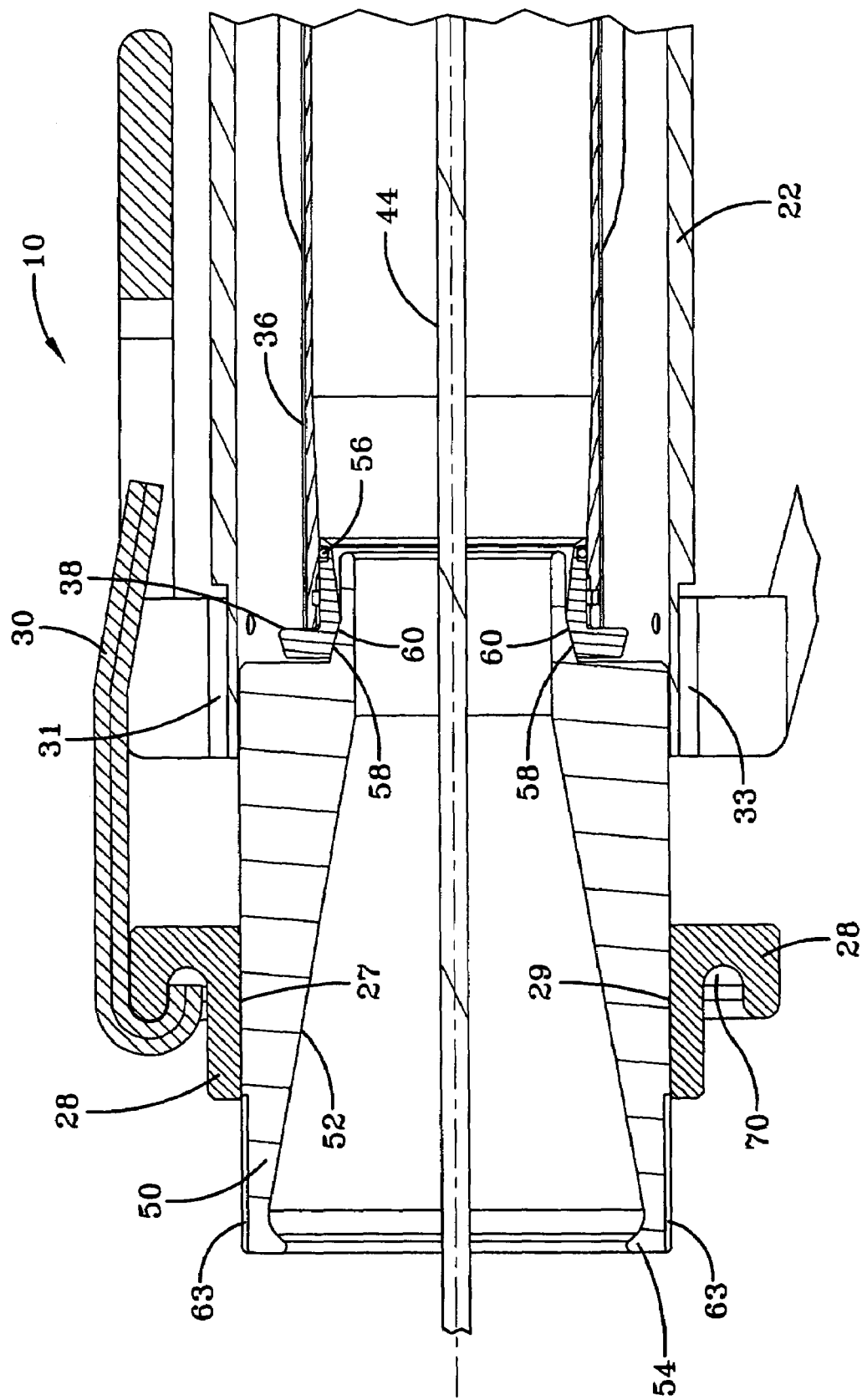
FIG. 4 is an enlarged view of the left end of FIG. 3.
Figure 6:
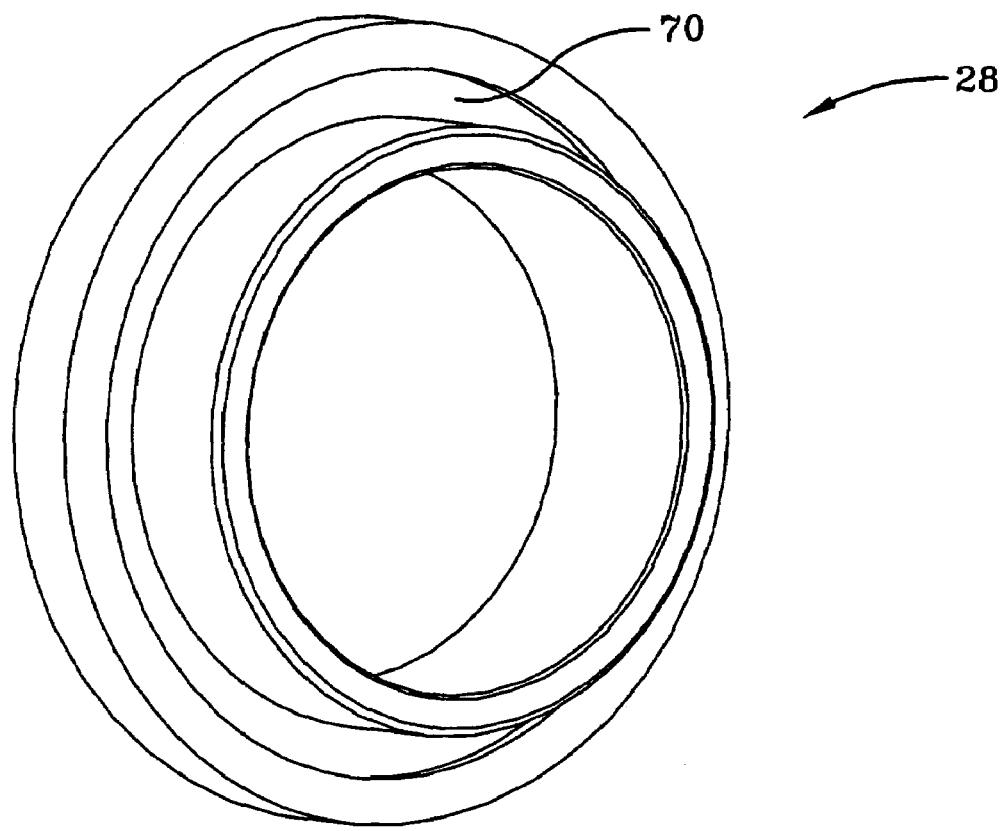
FIG. 6 is a perspective view of a retaining ring.
Figure 7:
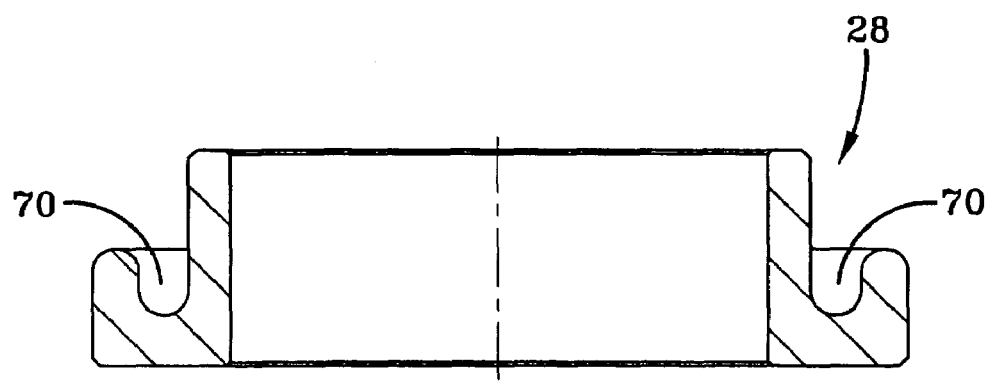
FIG. 7 is a sectional view of the retaining ring of FIG. 6.

FIG. 4 is an enlarged view of the left end of FIG. 3. Mask 38 fits in the end of rocket tube 36 and is sealed there by O-ring 56. Mask 38 includes an angled portion 58. Retaining funnel 50 includes an angled portion 60 that engages angled portion 58 of mask 38. The angles of the angled portions 60 and 58 are the same. Preferably, the angles are about fifteen degrees to secure motor tube from rotation during brushing. Retaining funnel 50 defines a funnel shaped interior 52 for ease in inserting brush 42 into rocket tube 36. The exterior surface of retaining funnel 50 threadingly engages the interior surface of retaining ring 28 at areas 27 and 29. Clamps 30 are attached to support tube 22 at areas 31, 33 by, for example, threaded fasteners in tapped holes 61 (FIG. 8) or welding. Clamps 30 engage groove 70 in retaining ring 28. See FIGS. 6 and 7 for enlarged views of retaining ring 28. Grooves in area 63 in retaining funnel 50 facilitate gripping and screwing in retaining funnel firmly against mask 40 further preventing motor tube rotation during brushing. Slot openings 26 (FIGS. 5 and 8) provide handling access to rocket motor tube while inserting and extracting rocket motor tube to and from the apparatus.

Figure 5:
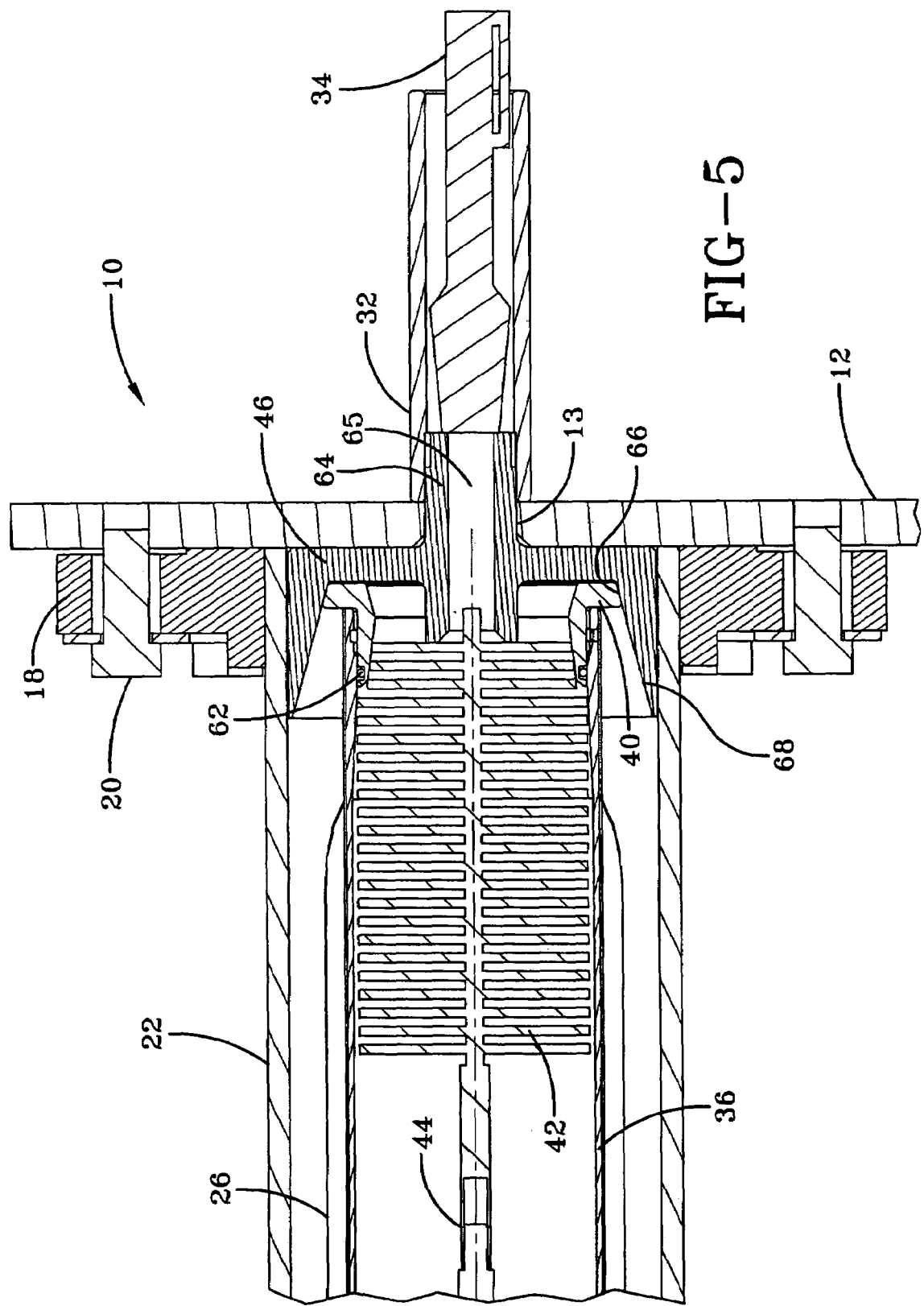
FIG. 5 is an enlarged view of the right end of FIG. 3.
Figure 9:
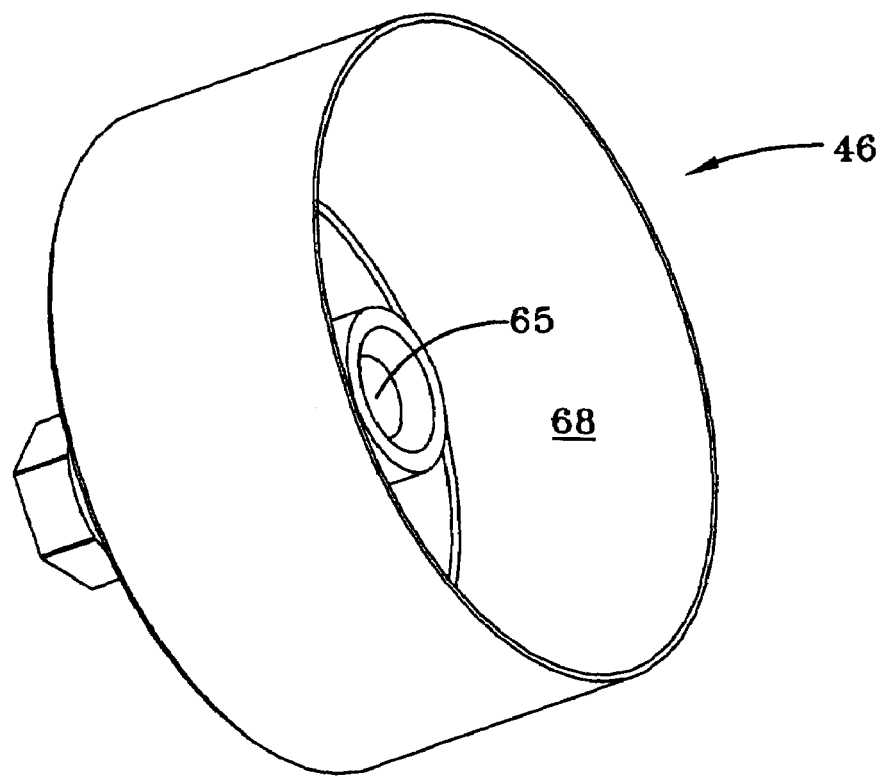
FIG. 9 is a perspective view of a stop.
Figure 10:
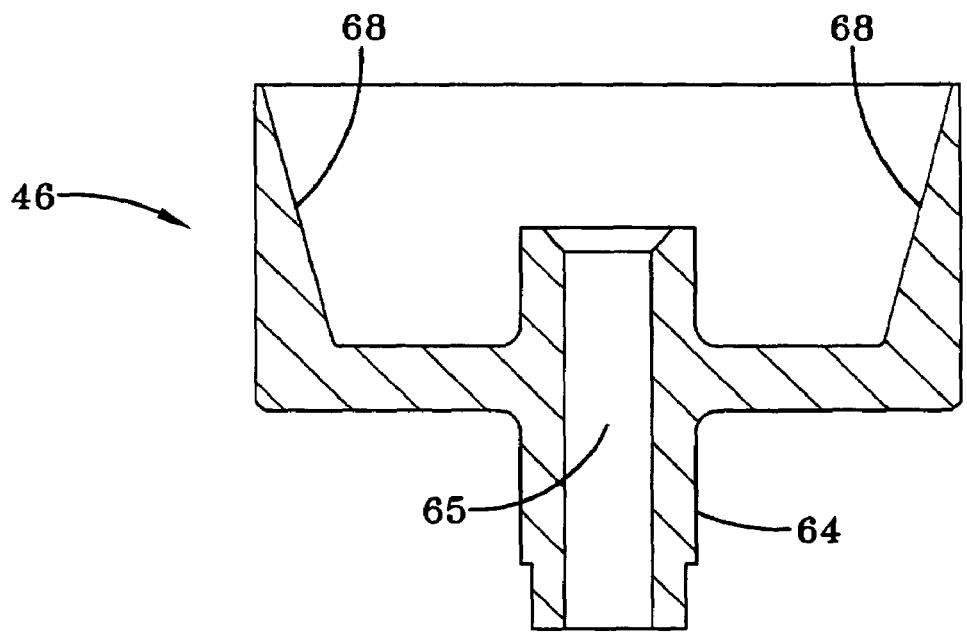
FIG. 10 is a sectional view of a stop.

FIG. 5 is an enlarged view of the right end of FIG. 3. Mask 40 fits in the end of rocket tube 36 and is sealed there by O-ring 62. Mask 40 includes an angled portion 66. Stop 46 includes an angled portion 68 that engages angled portion 66 of mask 40. The angles of the angled portions 68 and 66 are the same. Preferably, the angles are about fifteen degrees to prevent rotation during brushing. The stop 46 includes a cylindrical portion 64 that extends through the opening 13 in the support plate 12. FIGS. 9 and 10 are enlarged views of stop 46. A flashlight holder 32 is attached to the cylindrical portion 64 of the stop 46 by, for example, threads or welding. A flashlight 34 is disposed in the flashlight holder 32. Stop 46 is attached to the interior surface of support tube 22 by, for example, threads or welding.

In operation, a rocket tube 36 has previously had a substantially continuous bead of liner deposited therein. The bead of liner must now be spread as evenly as possible on the interior of the rocket motor tube. Rocket motor tube 36 with masks 38, 40 is inserted in support tube 22. Angled portion 66 of mask 40 will engage angled portion 68 of stop 46. Retaining funnel 50 is inserted in rocket tube 36 so that angled portion 60 of retaining funnel 50 engages angled portion 58 of mask 38. Retaining funnel 50 threadingly engages retainer ring 28. Clamps 30 are inserted in groove 70 of retaining ring 28. Retaining funnel 50 threadingly engages retainer ring 28 to tighten funnel and secure the rocket motor tube 36 in the support tube 22 by pressing against mask 38. Brush 42 is primed with liquid liner and inserted into funnel 52 and thence into rocket tube 36. Brush 42 is rotated by power tool 48 and manually moved axially back and forth inside tube 36 to evenly spread the previously deposited liner.

To inspect the coverage of the tube interior by the liner, the brush 42 is removed and the flashlight 34 is turned on. Light from flashlight 34 shines through stop 46 inspection hole 65 and illuminates the interior of rocket motor tube 36. One may then visually inspect the interior of the tube by looking into the end of the tube opposite the flashlight. If additional spreading is required, the operation is repeated. When used in conjunction with U.S. patent application Ser. No. 10/927,647, filed on Aug. 25, 2004, entitled "Apparatus For Applying Liquid Liner To Rocket Tube," mask 40 and mask 38 have equal outside diameters so that liner may be added or removed as and where required. After any such correction, the present invention is again used to spread the liner as previously described until the desired liner weight is achieved.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. An apparatus for spreading a liner in a rocket motor tube, comprising:
    a support plate comprising an opening there through;
    a flange comprising a center opening attached to the support plate;
    a support tube inserting into the center opening of the flange;
    a stop being disposed in the support tube, the stop abutting the support plate and engaging a first mask on one end of the rocket motor tube;
    a retaining funnel engaging a second mask on an other end of the rocket motor tube;
    a retaining ring threadingly engaging the retaining funnel;
    at least two clamps attached to the support tube and engaging the retaining ring; and
    a spreading element for spreading a liner in the rocket motor tube,
    wherein the support plate is mounted to a table.

2. The apparatus of claim 1 wherein said spreading element comprises a brush disposed in the rocket motor tube, the brush includes a rod attached to a power tool.

3. The apparatus of claim 1, wherein the stop includes a cylindrical portion, which extends through the opening in the support plate, and
    wherein the apparatus further comprises a flashlight holder attached to the cylindrical portion of the stop and a flashlight disposed in the flashlight holder.

4. The apparatus of claim 1, wherein the stop includes an angled portion and the first mask on the one end of the rocket motor tube includes an angled portion, the angled portion of the stop and the angled portion of the first mask include a same angle.

5. The apparatus of claim 1, wherein the retaining funnel includes an angled portion and the second mask on the other end of the rocket motor tube includes an angled portion, the angled portion of the retaining funnel and the angled portion of the second mask include a same angle.

6. The apparatus of claim 4, wherein the same angle is about 15 degrees.

7. The apparatus of claim 5, wherein the same angle is about 15 degrees.

8. The apparatus of claim 1, wherein the support plate is a substantially vertical support plate relative to the support tube.

9. The apparatus of claim 1, wherein the spreading element comprises a brush.

10. The apparatus of claim 1, wherein the liner is a liquid liner.

11. The apparatus of claim 1, wherein the rocket motor tube comprises an interior portion to receive said liner.

12. The apparatus of claim 1, wherein said spreading element comprises a brush, the spreading element imparts an axial movement on the brush to spread the liner in the rocket motor tube.

13. The apparatus of claim 1, wherein the retaining funnel includes a funnel shaped interior portion.

14. The apparatus of claim 1, wherein an exterior surface of the retaining funnel is threadingly engaged to an interior surface of the retaining ring.

15. An apparatus for spreading a liner in a rocket motor tube, comprising:
    a support plate comprising an opening there through;
    a flange comprising a center opening for attachment to the support plate;
    a support tube inserting into the center opening of the flange;
    a stop being disposed in the support tube, the stop abutting the support plate and engaging a first mask on a first end of the rocket motor tube;
    a retaining funnel engaging a second mask on a second end of the rocket motor tube;
    a retaining ring threadingly engaging the retaining funnel;
    at least two clamps attached to the support tube and engaging the retaining ring; and
    a spreading element for spreading a liner in the rocket motor tube,
    wherein the support plate is attached to a floor surface.

* * * * *